United States Patent
Hall et al.

(10) Patent No.: US 10,293,825 B2
(45) Date of Patent: May 21, 2019

(54) INTELLIGENT COASTING MANAGEMENT

(71) Applicant: Cummins Inc., Columbus, IN (US)

(72) Inventors: Tony James Hall, Bernus Point, NY (US); Daniel Reed Dempsey, Columbus, IN (US)

(73) Assignee: Cummins Inc., Columbus, IN (US)

( * ) Notice: Subject to any disclaimer, the term of this patent is extended or adjusted under 35 U.S.C. 154(b) by 307 days.

(21) Appl. No.: 15/273,028

(22) Filed: Sep. 22, 2016

(65) Prior Publication Data
US 2017/0080945 A1   Mar. 23, 2017

Related U.S. Application Data

(60) Provisional application No. 62/221,912, filed on Sep. 22, 2015.

(51) Int. Cl.
| | |
|---|---|
| *B60W 30/18* | (2012.01) |
| *B60W 10/06* | (2006.01) |
| *B60W 10/02* | (2006.01) |
| *B60W 10/10* | (2012.01) |
| *F02D 41/02* | (2006.01) |
| *F02D 41/08* | (2006.01) |
| *F02D 41/12* | (2006.01) |
| *F02D 41/00* | (2006.01) |

(52) U.S. Cl.
CPC ...... *B60W 30/18072* (2013.01); *B60W 10/02* (2013.01); *B60W 10/06* (2013.01); *B60W 10/10* (2013.01); *F02D 41/005* (2013.01); *F02D 41/021* (2013.01); *F02D 41/08* (2013.01); *F02D 41/12* (2013.01); *B60W 2030/1809* (2013.01); *B60W 2030/18081* (2013.01); *B60W 2510/0604* (2013.01); *B60W 2520/10* (2013.01); *B60W 2540/10* (2013.01); *B60W 2550/142* (2013.01); *B60W 2550/402* (2013.01); *B60W 2710/065* (2013.01); *B60W 2710/1005* (2013.01); *B60Y 2400/442* (2013.01); *F02D 2200/501* (2013.01); *F02D 2200/602* (2013.01); *F02D 2200/701* (2013.01); *Y02T 10/47* (2013.01); *Y02T 10/52* (2013.01); *Y02T 10/76* (2013.01); *Y02T 10/84* (2013.01)

(58) Field of Classification Search
None
See application file for complete search history.

(56) References Cited

U.S. PATENT DOCUMENTS

| | | | |
|---|---|---|---|
| 8,108,112 B2 | 1/2012 | Thor | |
| 2014/0069085 A1* | 3/2014 | Alm | F02D 9/04 60/274 |
| 2014/0116247 A1* | 5/2014 | Nakazato | F02D 41/0245 95/20 |

(Continued)

FOREIGN PATENT DOCUMENTS

| | | |
|---|---|---|
| WO | WO-2014/055016 | 4/2014 |
| WO | WO-2014/055019 | 4/2014 |

*Primary Examiner* — Justin Holmes
(74) *Attorney, Agent, or Firm* — Foley & Lardner LLP

(57) ABSTRACT

Methods of operating internal combustion engines are provided. A controller detects a coasting event while an associated vehicle is in motion. In response to the coasting event, the controller directs at least a portion of an exhaust gas output by an exhaust system of an internal combustion engine of the vehicle into an intake system of the internal combustion engine.

23 Claims, 3 Drawing Sheets

(56) References Cited

U.S. PATENT DOCUMENTS

| | | | |
|---|---|---|---|
| 2015/0040560 A1* | 2/2015 | Jozsa | F02D 41/0065 60/602 |
| 2015/0149058 A1* | 5/2015 | Kim | F16D 48/06 701/93 |
| 2015/0158491 A1* | 6/2015 | Suzuki | B60W 30/18072 701/67 |
| 2015/0259008 A1* | 9/2015 | Seguchi | B62D 15/025 701/41 |
| 2017/0074846 A1* | 3/2017 | Bell | G01N 33/0037 |

* cited by examiner

INTELLIGENT COASTING MANAGEMENT

CROSS-REFERENCE TO RELATED PATENT APPLICATIONS

The present application claims priority to U.S. Provisional Patent Application No. 62/221,912, filed Sep. 22, 2015, and entitled "INTELLIGENT COASTING MANAGEMENT," and the contents of which are incorporated herein by reference in its entirety.

TECHNICAL FIELD

The present disclosure relates to internal combustion engines.

BACKGROUND

Internal combustion engines rely on cyclically collecting and igniting a combination of air and fuel in one or more combustion chambers. A given ignition drives a moving component disposed in a combustion chamber (e.g., a piston), ultimately generating a rotational force (e.g., via a crankshaft). The rotational force may be applied to rotate a wheel (e.g., via a transmission communicatively engaged to the crankshaft), thereby causing an associated vehicle to move.

When not actively generating a rotational force, the configuration of such an internal combustion engine may impede an existing movement of the vehicle. For example, a user may regulate an output force of an internal combustion engine by modulating an air intake throttle, for example via a pedal. When the user closes the throttle, little or no air travels into the internal combustion engine. At the same time, when pistons disposed in the internal combustion engine are drivingly engaged to one or more wheels (e.g., via a crankshaft engaged to a transmission, which in turn is engaged to one or more wheels), the wheels continue to drive the movement of the pistons within each respective combustion chamber as long as the vehicle is in motion. As such, the wheels drive a continued movement of the associated crankshaft and pistons disposed in the internal combustion engine, which effectively resists the continued movement of the vehicle. Further, while the throttle is closed or almost closed, the pistons push and pull against a static or almost static volume of air within each combustion chamber, further impeding the movement of the vehicle.

SUMMARY

One embodiment relates to a method of operating an internal combustion engine of a vehicle. The method includes detecting, by a controller, a coasting event when the vehicle is in motion. The method further includes, responsive to detecting a coasting event, directing at least a portion of an exhaust gas output by an exhaust system of the internal combustion engine into an intake system of the internal combustion engine.

Another embodiment relates to an apparatus including an exhaust entry port, an exhaust exit port, at least one valve, and a controller. The exhaust entry port is communicatively coupled to an exhaust system of an internal combustion engine of a vehicle. The exhaust exit port is communicatively coupled to an intake system of the internal combustion engine. The at least one valve is communicatively coupled between the exhaust entry port and the exhaust exit port and structured to selectively allow gas flow between the exhaust entry port and the exhaust exit port. The controller is coupled to the intake system and the at least one valve. The controller is configured to detect a coasting event when the vehicle is in motion, and control the at least one valve to direct a portion of the exhaust gas received at the exhaust entry port to the intake system via the exhaust exit port.

Another embodiment relates to a controller for use with an internal combustion engine system of a vehicle, the internal combustion engine system having an inlet system and an exhaust system. The controller includes an input circuit, a coasting detection circuit, and an output circuit. the input circuit is circuit structured to receive input related to a coasting event of the vehicle while the vehicle is in motion. The coasting detection circuit is structured to detect, based on the received input, that the coasting event has occurred and to generate an output signal to direct at least a portion of an exhaust gas output by the exhaust system of the vehicle into the intake system. The output circuit is structured to provide the output signal to an actuator of at least one valve connected between the exhaust system and the intake system.

Another embodiment relates to a method of operating an internal combustion engine of a vehicle. The method includes detecting, by a controller, a coasting event while the vehicle is in motion. The method further includes activating, by the controller, an idle condition in response to the coasting event, the activating of the idle condition including drivingly decoupling the internal combustion engine from at least one wheel via a transmission and maintaining a nominal operating speed of the internal combustion engine.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion assemblies and methods of operating internal combustion assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1A:
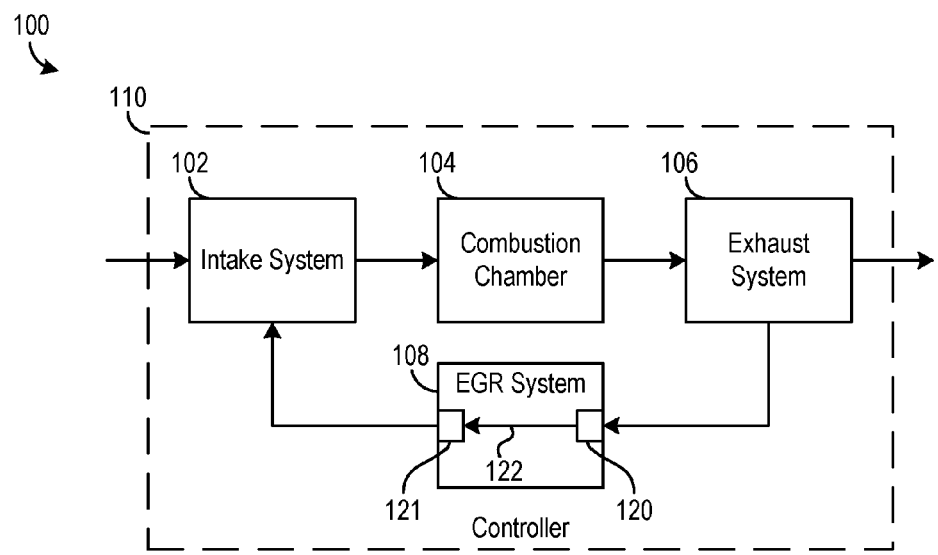
FIG. 1A illustrates a schematic block diagram of a representation of a vehicle indicating gas flows through an internal combustion engine system and exhaust aftertreatment system, according to an embodiment of the present disclosure.

Referring now to FIG. 1A, a vehicle 100 powered by an internal combustion engine includes an intake system 102, a combustion chamber 104, an exhaust system 106, and an exhaust gas recirculation ("EGR") system 108. The intake system 102 includes one or more air conduits, chambers, filtration devices, and the like that are collectively configured to route air from the atmosphere to the combustion chamber 104. In some arrangements, the volume of air flowing from the atmosphere into the intake system 102 is regulated by a throttle. The combustion chamber 104 is a hollow chamber within which air from the intake system 102 and fuel from a fuel delivery system are collected and ignited, thereby applying a force upon a movable component (e.g., a piston). In some arrangements, the movable component is a piston configured for bidirectional movement, and the piston is drivingly engaged to a crankshaft configured to translate the bidirectional movement of the piston into a rotational movement. As used herein, the term "drivingly" (e.g., "drivingly engaged" or "drivingly coupled") describes a communicative relationship between components, for example where an output force from either a first component or a second component is directly or indirectly communicated to the other of the first component or the second component. The combustion chamber 104 may be comprised of one or more fuel injectors, spark plugs, and valves (e.g., intake and exhaust valves). The exhaust system 106 includes one or more exhaust conduits, chambers, filtration systems and the like that are collectively configured to route exhaust gas from the combustion chamber 104 out to the atmosphere.

The EGR system 108 is configured to selectively redirect some of the exhaust gas from the exhaust system 106 back to the intake system 102. The EGR system 108 allows exhaust gas to supplement or replace atmospheric air in the intake system 102 that is delivered into the combustion chamber 104. As such, the EGR system 108 accommodates a reduction in airflow volume in the intake system (e.g., where an associated throttle is closed or almost closed) by providing a compensatory volume of exhaust gas. In some arrangements, the EGR system 108 includes an exhaust entry port 120 (e.g., an aperture that may include a valve) in fluid receiving communication with the exhaust system 106, an exhaust exit port 121 (e.g., also an aperture that may include a valve) in fluid providing communication with the intake system 102, and an EGR conduit 122 providing exhaust gas from the exhaust entry port to the exhaust exit port. In one or more embodiments, the conduit 122 also can include an aperture that may include a valve.

The controller 110 is a processor and non-transient computer-readable media that together provide a circuit configured to perform operations that include sending and receiving signals throughout the vehicle 100. In some arrangements, the controller 110 is communicatively coupled to a plurality of sensors disposed throughout the vehicle 100 (e.g., sensors disposed at the intake system 102, the combustion chamber 104, the exhaust system 106, an accelerator pedal, a brake pedal, and so on). Further, the controller 110 can be communicatively coupled to a plurality of mechanical devices that can be electrically actuated (e.g., valves associated with the EGR system 108).

In operation, a user of the vehicle 100 may cause the intake system 102 to reduce an airflow from the atmosphere to the combustion chamber 102 (e.g., by closing a throttle of the intake system 102). The controller 110 may detect the reduction of airflow in the intake system 102 and open or further open one or more valves disposed in the EGR system 108. Opening valves of the EGR system 108 allows for a portion of an exhaust gas to be redirected from the exhaust system 106 to the intake system 102. The exhaust gas combines with the reduced airflow in the intake system 102, and is provided to the combustion chamber 104. The controller 110 may allow the EGR system 108 to recirculate exhaust gas in this manner until the controller 110 detects an increase in airflow in the intake system 102. In some arrangements, the EGR system 108 recirculates exhaust gas in this manner until airflow in the intake system 102 reaches a threshold minimum value. In some arrangements, the EGR system 108 is continuously providing a compensatory amount of recirculated exhaust gas, relative to the airflow in the intake system.

Figure 1B:
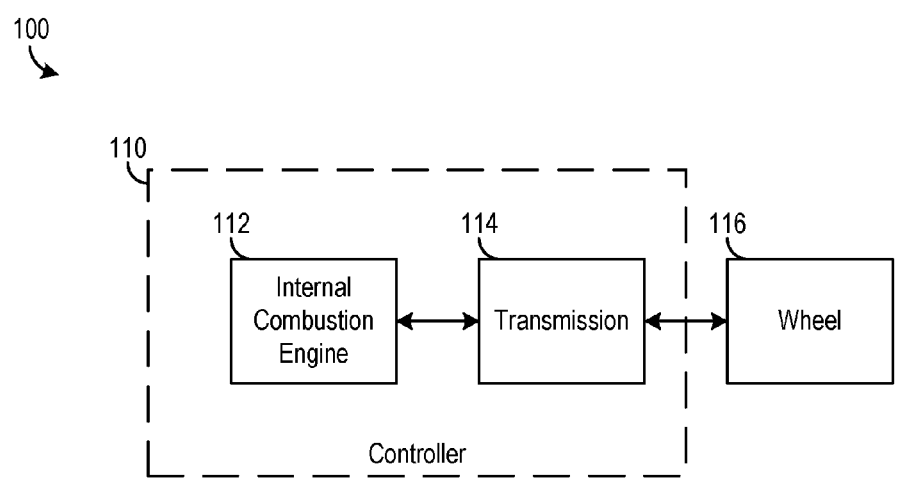
FIG. 1B illustrates a schematic block diagram of a representation of the vehicle of FIG. 1A, indicating the communication of rotational forces among the internal combustion engine, the vehicle transmission and the at least one wheel of the vehicle, according to an embodiment of the present disclosure.

Referring now to FIG. 1B, the vehicle 100 includes an internal combustion engine 112, a transmission 114, and at least one wheel 116 drivingly coupled to the transmission 114. The internal combustion engine 112 is configured to selectively provide a rotational force (e.g., in the manner discussed with respect to FIG. 1A, above). The internal combustion engine 112 typically consumes combustible fuel (e.g., gasoline, diesel fuel, natural gas, and so on) during operation in order to provide the rotational force to enable the movement of the vehicle 100. Further, in some arrangements, the internal combustion engine 112 includes one or more combustion chambers 104 and is associated with the intake system 102, the exhaust system 106, and the EGR system 108 discussed above with respect to FIG. 1A.

The transmission 114 is configured to selectively exchange rotational forces between the internal combustion engine 112 and the at least one wheel 116. In some arrangements, the transmission 114 includes one or more gearsets configured to receive a rotational force with a first rotational speed and a first rotational torque at an input (e.g., from a crankshaft) and produce a second rotational speed and a second rotational torque at an output (e.g., the wheel 116). For example, the transmission 114 can convert a rotational input with a low speed and a high torque to a rotational output with a comparatively high speed and a comparatively low torque (e.g., where the vehicle 100 is traveling at a high speed in a high gear). The transmission 114 can exchange rotational forces in either direction (e.g., from internal combustion engine 112 to the wheel 116 or from the wheel 116 to the internal combustion engine 112).

The transmission 114 may be configured to drivingly decouple the internal combustion engine 112 from the at least one wheel 116. In one such arrangement, the transmission 114 includes a neutral setting such that the rotational output of the internal combustion engine 112 is effectively disconnected from the at least one wheel 116. As such, in the neutral setting, the operation of the internal combustion engine 112 is independent from the at least one wheel 116, and no rotational forces are exchanged between them. In some arrangements, the controller 110 is configured to cause the internal combustion engine 112 to idle when the internal combustion engine 112 is drivingly decoupled from the at least one wheel 116. Idling is a process of maintaining the operation speed of the internal combustion engine 112 at some nominal level, which includes cyclically collecting and igniting low volumes of air and fuel within at low frequencies (e.g., a few hundred RPMs). As such, a correspondingly nominal amount of fuel is consumed while the internal combustion engine 112 is idling.

Figure 2:
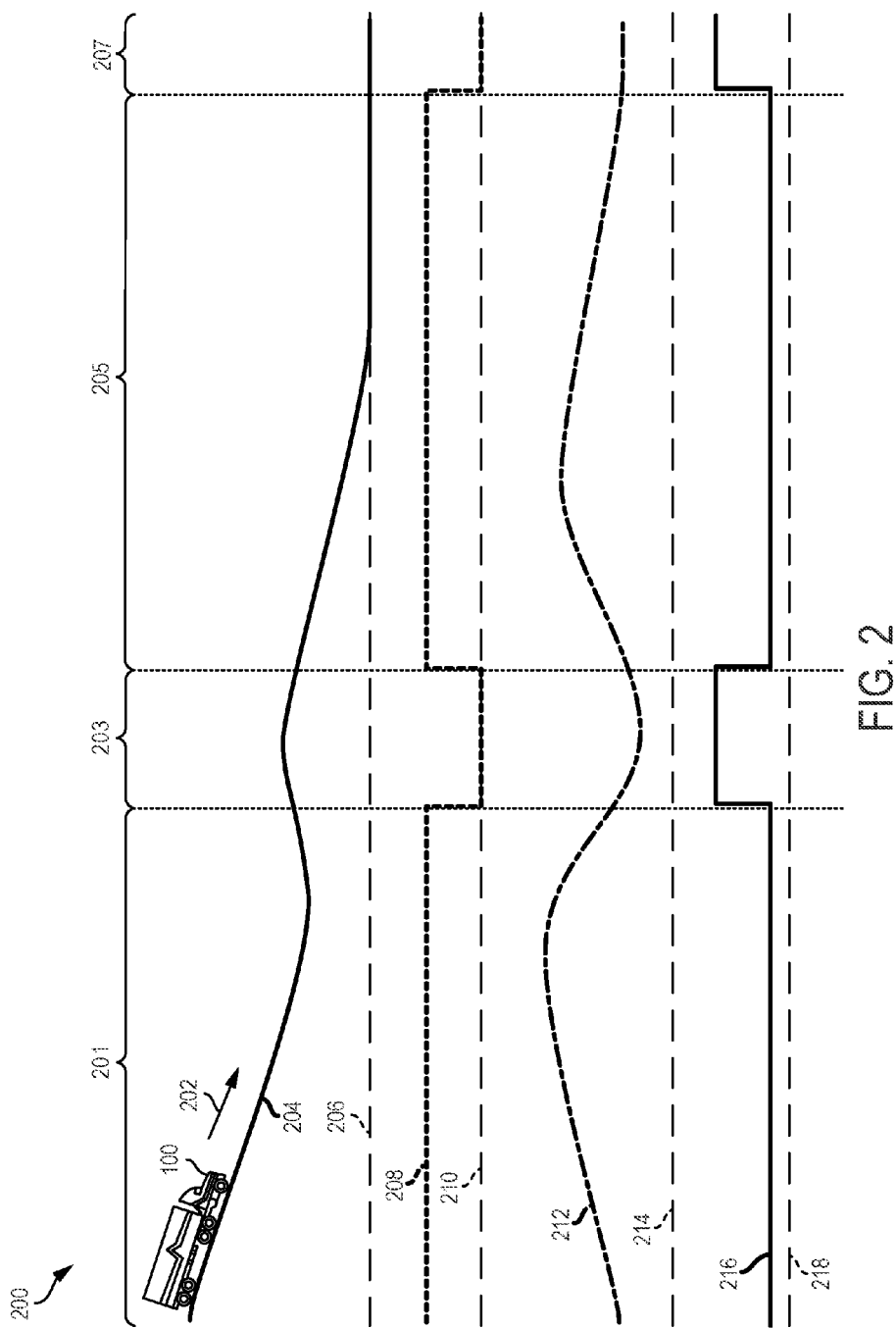
FIG. 2 depicts a series of charts illustrating the relationship of various related aspects of the vehicle of FIGS. 1A and 1B along a path of travel, according to an embodiment of the present disclosure.

Referring now to FIG. 2, the operation of an intelligent coasting feature 200 is shown. The intelligent coasting feature 200 is performed by the controller 110 and various components communicatively engaged thereto to decrease an overall fuel consumption of the vehicle 100 by decreasing a resistance imposed by the internal combustion engine 112. In some arrangements, the resistance may arise from reduced or static volumes of airflow to the combustion chambers 104. For example, where the combustion chamber 104 includes a piston, the piston may continue to oscillate within the combustion chamber 104 despite a reduced or static volume of air within (e.g., when a corresponding throttle is closed and the internal combustion engine 112 is idling; or when the at least one wheel 116 is drivingly coupled to the internal combustion engine 112 while the vehicle 100 is in motion). The alternating increase and reduction of air pressure within the combustion chamber 104 pushes and pulls against the piston, effectively resisting the piston oscillation. As such, a greater amount of force to overcome the resistance (i.e., greater fuel consumption) may be needed for the idling process, and/or the resistance may impart a drag on the motion of the vehicle (i.e., where the internal combustion engine 112 is drivingly engaged to the at least one wheel 116). The intelligent coasting feature 200 may relieve the resistance by opening or further opening the EGR system 108 to provide a compensatory airflow to the internal combustion chamber 104 to decrease this type of resistance.

In addition, the resistance may arise when the internal combustion engine 112 is not actively producing a rotational force while still drivingly engaged to the at least one wheel 116. In such an arrangement, the at least one wheel 116 is effectively driving the operation of the internal combustion engine 112 while the vehicle 100 is in motion. In other words, the rotation of the at least one wheel 116 causes a corresponding rotation of the crankshaft and oscillation of the pistons of the internal combustion engine 112 at a frequency determined by the gearset of the transmission 114. As such, the operation of the internal combustion engine 112 imparts a drag on the continued rotation of the at least one wheel 116, and therefore imparts a drag on the motion of the vehicle 100. The intelligent coasting feature 200 may also relieve this type of resistance by drivingly decoupling the at least one wheel 116 from the internal combustion engine 112 by, for example, causing the transmission 114 to switch to a neutral setting and causing the internal combustion engine 112 to idle. As such, the intelligent coasting feature 200 may comprise one or both of manipulating the EGR system 108 and selectively decoupling the at least one wheel 116 from the internal combustion engine 112.

FIG. 2 includes an elevation graph 204, an activation graph 208, a velocity graph 212, and a consumption graph 216. The vehicle 100 is shown following a path of travel 202 along the elevation graph 204. The elevation graph 204 comprises X-axis values indicating horizontal positions of the vehicle 100 (e.g., a range from 0 to 1 mile) and corresponding Y-axis values indicating the elevation of the vehicle 100 relative to an elevation baseline 206 (e.g., sea level).

The activation graph 208 indicates whether the intelligent coasting feature 200 is activated or deactivated, corresponding to the X-axis values of the elevation graph 204 (i.e., indicating whether the intelligent coasting feature 200 is activated based on the vehicle's horizontal position along the path of travel 202). Where the Y-axis of the activation graph 208 matches the deactivation value 210, the intelligent coasting feature 200 is deactivated. Where the Y-axis of the activation graph 208 is above the deactivation value 210, the intelligent coasting feature 200 is activated.

The velocity graph 212 indicates the velocity of the vehicle 100 along the X-axis of the path of travel 202. The Y-axis corresponds to forward velocity values, relative to a stopped position at a velocity baseline 214.

The consumption graph 216 indicates fuel consumption along the X-axis of the path travel 202. The Y-axis corresponds to a fuel consumption value (e.g., miles per gallon, volume per unit time, or some other measure of consumption), relative to a consumption baseline 218 where no fuel is consumed.

The path of travel 202 is sequentially divided into a first zone 201, a second zone 203, a third zone 205 and a fourth zone 207, designated by positions of the vehicle 100 along the X-axis. In the first zone 201, the vehicle 100 is largely in a descent as indicated by the elevation graph 204, and as such, is largely increasing in velocity as a result of gravity, as shown by the velocity graph. The elevation begins to rise towards the end of the first zone 201, and the velocity of the vehicle 100 begins to drop correspondingly. Throughout the first zone 201, the intelligent coasting feature 200 is activated (i.e., as shown on the activation graph 208) as additional rotational force from the internal combustion engine 112 is not needed to maintain the motion of the vehicle 100. As such, the EGR system 108 may be activated and/or the internal combustion engine 112 may be idling and drivingly decoupled from the at least one wheel 116 within the first zone 201. Activating the EGR system 108 and/or decoupling the internal combustion engine 112 effectively reduces the resistance imposed by the internal combustion engine 112.

The vehicle 100 enters the second zone 203 after the first zone 201. The start of the second zone 203 is defined by a point where the internal combustion engine 112 is needed to provide a rotational force sufficient to increase the velocity of the vehicle 100. During this time, the intelligent coasting feature 200 is deactivated (i.e., as shown by the activation graph 208) and the internal combustion engine 112 consumes an increased amount of fuel to provide the at least one wheel 116 with a rotational force sufficient to increase the velocity of the vehicle 100 (e.g., as shown by the consumption graph 216).

The vehicle 100 enters the third zone 205 of the path of travel 202 when the internal combustion engine 112 is not needed to produce a rotational force. In the third zone 206, the intelligent coasting feature 200 reactivates and the vehicle 100 accelerates as it travels downhill. After the elevation graph 204 levels out for a period of time, the vehicle 100 enters the fourth zone 207, where the internal combustion engine is again needed to increase the velocity of the vehicle 100.

As one of skill in the relevant art would appreciate, the operation of the intelligent coasting feature 200 enables the vehicle 100 to travel further along the path of travel 202 before needing to engage the internal combustion engine 112. The intelligent coasting feature 200 reduces the resistance the internal combustion engine 112 imposes to the at least one wheel 116, thereby allowing the vehicle 100 to accelerate more quickly and maintain an acceptable velocity over a longer distance (e.g., as shown by the extended length of the first zone 201 and the third zone 205).

Figure 3:
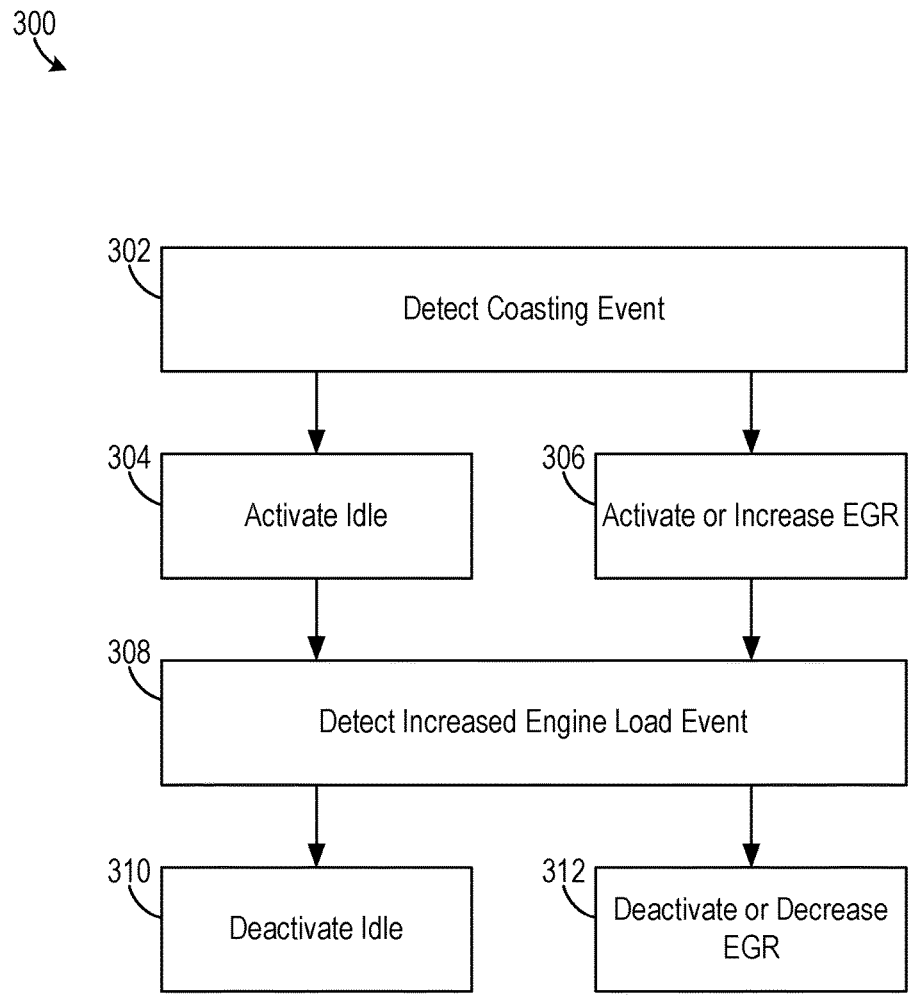
FIG. 3 depicts a flow diagram showing an example method of operating an internal combustion engine, according to an embodiment of the present disclosure.

FIG. 3 illustrates a flow diagram showing a method of operating an internal combustion engine (e.g., the internal combustion engine 112) of a vehicle (e.g., the vehicle 100) that includes an intelligent coasting feature (e.g., the intelligent coasting feature 200). In one or more embodiments, the method shown in FIG. 3 may be executed by the controller 110 shown in FIG. 1. At 302, a coasting event is detected. A coasting event includes periods of time where the vehicle is in motion, but does not need the internal combustion engine to produce a rotational force. The coasting event may be detected by a controller (e.g., the controller 110) associated with the internal combustion engine. For example, a coasting event may be detected where the vehicle is in motion and an accelerator pedal is fully decompressed and/or an intake throttle is closed. As another example, a coasting event may be detected where the vehicle is in motion and terrain data indicates that the internal combustion engine may not be needed (e.g., digital information relating to the geographic position of the vehicle and the surrounding terrain characteristics, for example, GPS coordinates and mapping data indicating that the vehicle is descending down a hill).

At 304 an idling condition is activated. The controller may activate an idling condition by causing a transmission (e.g., the transmission 114) to drivingly decouple the internal combustion engine from one or more wheels (e.g., the at least one wheel 116) and causing the internal combustion engine to maintain a nominal operating speed. For example, the controller may cause the transmission to engage a neutral setting, and cause the internal combustion engine to operate independently of the wheels at 500 RPMs. In some arrangements, the controller may be configured to wait a set period of time before activating the idling condition (e.g., detecting a coasting event for at least three seconds).

At 306, an amount of EGR is increased. The controller may cause an EGR system (e.g., the EGR system 108) to enable or increase a flow of exhaust gas from an exhaust system (e.g., the exhaust system 106) to an intake system (e.g., the intake system 102) to compensate for a reduction of atmospheric airflow in the intake system. The EGR may be increased by the actuation of one or more airflow valves disposed in the EGR system. In some arrangements, the controller may be configured to wait a set period of time before increasing the EGR (e.g., detecting a coasting event for at least five seconds). In some arrangements, the controller may be configured to actuate the one or more airflow valves such that the combined flow rate of the exhaust and the atmospheric air into the intake system is substantially constant (for example, staying within about 5% to about 10% of a predetermined value).

At 308, an increased engine load event is detected. The increased engine load event is an event where a rotational force provided by the internal combustion engine may be needed, for example to increase a vehicle velocity. The increased engine load event may be detected by the controller. In some arrangements, the controller detects the increased engine load event as an actuation of an accelerator pedal. The controller may also consider a threshold negative acceleration (or deceleration) and/or a threshold minimum vehicle velocity as an increased engine load event. For example, in one or more embodiments, the controller may detect the increased engine load event if the deceleration of the vehicle is greater than a threshold vehicle deceleration. In one or more embodiments, the controller may detect the increased engine load event if the velocity of the vehicle is below the threshold minimum vehicle velocity. Further, the controller may have access to terrain data indicating a present or forthcoming incline in the road on which the vehicle is driving and detect that an increased engine load event is present or forthcoming.

At 310, the idle is deactivated. The idling condition may be deactivated by the controller, which may include the internal combustion engine drivingly reengaging one or more wheels via a transmission.

At 312, the EGR is decreased. The controller may be configured to reduce or eliminate the volume of exhaust gas recirculated to the intake system by closing one or more valves disposed in the EGR system.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

Some of the functional units, such as the controller 110 shown in FIG. 1, described in this specification may be implemented as one or more hardware circuits comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the controller shown in FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media, machine-readable content, or memory) may be a tangible computer readable storage medium storing computer readable program code or instructions. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer (such as via the controller 110 of FIG. 1), partly on the computer, as a stand-alone computer-readable package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of operating an internal combustion engine of a vehicle, the method comprising:
   detecting, by a controller, a coasting event when the vehicle is in motion;
   responsive to detecting a coasting event, directing at least a portion of an exhaust gas output by an exhaust system of the internal combustion engine into an intake system of the internal combustion engine;
   detecting, subsequent to directing at least a portion of the exhaust gas, an increased engine load event while the vehicle is in motion; and
   ceasing, responsive to detecting the increased engine load event, directing the exhaust gas output by the exhaust gas system into the intake system.

2. The method of claim 1, wherein directing at least a portion of the exhaust gas output by an exhaust system of the internal combustion engine into an intake system of the internal combustion engine includes actuating at least one airflow valve connected between the exhaust system and the intake system.

3. A method of operating an internal combustion engine of a vehicle, the method comprising:
   detecting, by a controller, a coasting event when the vehicle is in motion; and
   responsive to detecting a coasting event, directing at least a portion of an exhaust gas output by an exhaust system of the internal combustion engine into an intake system of the internal combustion engine,
   wherein directing at least a portion of an exhaust gas output by an exhaust system of the internal combustion engine into an intake system of the internal combustion engine includes adjusting a flow rate of the exhaust gas into the intake system such that a combined flow rate of the exhaust gas and atmospheric air into the intake system is substantially constant.

4. The method of claim 1, wherein directing at least a portion of the exhaust gas output by an exhaust system of the internal combustion engine into an intake system of the internal combustion engine includes beginning directing at least a portion of the exhaust gas after a predetermined time following detecting, by the controller, the coasting event.

5. The method of claim 1, further comprising, responsive to detecting a coasting event, drivingly decoupling the internal combustion engine from at least one wheel of the vehicle.

6. An apparatus, comprising:
   an exhaust entry port communicatively coupled to an exhaust system of an internal combustion engine of a vehicle;
   an exhaust exit port communicatively coupled to an intake system of the internal combustion engine;
   at least one valve communicatively coupled between the exhaust entry port and the exhaust exit port, structured to selectively allow gas flow between the exhaust entry port and the exhaust exit port; and
   a controller coupled to the intake system and the at least one valve, the controller configured to:
      detect a coasting event when the vehicle is in motion, and
      control the at least one valve to direct a portion of the exhaust gas received at the exhaust entry port to the intake system via the exhaust exit port,
   wherein the detection of the coasting event when the vehicle is in motion includes receiving, from an intake system, a magnitude of atmospheric flow rate into the intake system, and determining whether a magnitude of atmospheric air flow rate into the intake system is below a threshold value.

7. An apparatus, comprising:
   an exhaust entry port communicatively coupled to an exhaust system of an internal combustion engine of vehicle;
   an exhaust exit port communicatively coupled to an intake system of the internal combustion engine;
   at least one valve communicatively coupled between the exhaust entry port and the exhaust exit port, structured to selectively allow gas flow between the exhaust entry port and the exhaust exit port; and
   a controller coupled to the intake system and the at least one valve, the controller configured to:
      detect a coasting event when the vehicle is in motion, and
      control the at least one valve to direct a portion of the exhaust gas received at the exhaust entry port to the intake system via the exhaust exit port,
   wherein the detection of the coasting event when the vehicle is in motion includes detecting that an accelerator pedal, which controls a flow rate of atmospheric air into the intake system, is fully decompressed.

8. An apparatus, comprising:
   an exhaust entry port communicatively coupled to an exhaust system of an internal combustion engine of a vehicle;
   an exhaust exit port communicatively coupled to an intake system of the internal combustion engine;
   at least one valve communicatively coupled between the exhaust entry port and the exhaust exit port, structured to selectively allow gas flow between the exhaust entry port and the exhaust exit port; and
   a controller coupled to the intake system and the at leas one valve, the controller configured to:
      detect a coasting event when the vehicle is in motion, and
      control the at least one valve to direct a portion of the exhaust gas received at the exhaust entry port to the intake system via the exhaust exit port,
   wherein the detection of the coasting event when the vehicle is in motion includes determining that the vehicle is descending based at least on a geographic position of the vehicle and mapping data stored in memory.

9. An apparatus, comprising:
   an exhaust entry port communicatively coupled to an exhaust system of an internal combustion engine of a vehicle;
   an exhaust exit port communicatively coupled to an intake system of the internal combustion engine;
   at least one valve communicatively coupled between the exhaust entry port and the exhaust exit port, structured to selectively allow gas flow between the exhaust entry port and the exhaust exit port; and a controller coupled to the intake system and the at least one valve, the controller configured to:
- detect a coasting event when the vehicle is in motion, and
- control the at least one valve to direct a portion of the exhaust gas received at the exhaust entry port to the intake system via the exhaust exit port, wherein the control of the at least one valve to direct a portion of the exhaust gas received at the exhaust entry port to the intake system via the exhaust exit port includes adjusting the at least one valve such that a combined flow rate of the exhaust gas and atmospheric air into the intake system is substantially constant.

10. An apparatus, comprising:
an exhaust entry port communicatively coupled to an exhaust system of an internal combustion engine of a vehicle;
an exhaust exit port communicatively coupled to an intake system of the internal combustion engine;
at least one valve communicatively coupled between the exhaust entry port and the exhaust exit port, structured to selectively allow gas flow between the exhaust entry port and the exhaust exit port; and
a controller coupled to the intake system and the at least one valve, the controller configured to:
- detect a coasting event when the vehicle is in motion, and
- control the at least one valve to direct a portion of the exhaust gas received at the exhaust entry port to the intake system via the exhaust exit port, wherein the controller is further configured to detect, subsequent to directing at least a portion of the exhaust gas, an increased engine load event while the vehicle is in motion, and to control the at least one valve to cease to direct the portion of the exhaust gas to the intake system.

11. The apparatus of claim 10, wherein the detection of the increased engine load event includes determining whether a velocity of the vehicle is below a threshold vehicle velocity.

12. The apparatus of claim 10, wherein the detection of the increased engine load event includes comparing a negative acceleration of the vehicle with a threshold negative acceleration.

13. An apparatus, comprising:
an exhaust entry port communicatively coupled to an exhaust system of an internal combustion engine of a vehicle;
an exhaust exit port communicatively coupled to an intake system of the internal combustion engine;
at least one valve communicatively coupled between the exhaust entry port and the exhaust exit port, structured to selectively allow gas flow between the exhaust entry port and the exhaust exit port; and
a controller coupled to the intake system and the at least one valve, the controller configured to:
- detect a coasting event when the vehicle is in motion, and
- control the at least one valve to direct a portion of the exhaust gas received at the exhaust entry port to the intake system via the exhaust exit port, wherein the control of the at least one valve to direct a portion of the exhaust gas received at the exhaust entry port to the intake system via the exhaust exit port includes waiting a set period of time after the coasting event is detected to control the at least one valve.

14. A controller for use with an internal combustion engine system of a vehicle, the internal combustion engine system having an inlet system and an exhaust system, the controller comprising:
an input circuit structured to receive input related to a coasting event of the vehicle while the vehicle is in motion;
a coasting detection circuit structured to detect, based on the received input, that the coasting event has occurred and to generate an output signal to direct at least a portion of an exhaust gas output by the exhaust system of the vehicle into the intake system;
an output circuit structured to provide the output signal to an actuator of at least one valve connected between the exhaust system and the intake system;
an engine load detection circuit structured to detect, subsequent to the detection of the coasting event, an increased engine load event while the vehicle is in motion and generate another output signal to cease to direct the exhaust gas into the intake system; and
the output circuit further structured to provide the another output signal to the actuator.

15. A controller for use with an internal combustion engine system of a vehicle, the internal combustion engine system having an inlet system and an exhaust system, the controller comprising:
an input circuit structured to receive input related to a coasting event of the vehicle while the vehicle is in motion;
a coasting detection circuit structured to detect, based on the received input, that the coasting event has occurred and to generate an output signal to direct at least a portion of an exhaust gas output by the exhaust system of the vehicle into the intake system; and
an output circuit structured to provide the output signal to an actuator of at least one valve connected between the exhaust system and the intake system,
wherein the input related to a coasting event includes a magnitude of atmospheric flow rate into the intake system, and wherein the coasting detection circuit is structured to detect that the coasting event has occurred if the magnitude is below a threshold value.

16. A controller for use with an internal combustion engine system of a vehicle, the internal combustion engine system having an inlet system and an exhaust system, the controller comprising:
an input circuit structured to receive input related to a coasting event of the vehicle while the vehicle is in motion;
a coasting detection circuit structured to detect, based on the received input, that the coasting event has occurred and to generate an output signal to direct at least a portion of an exhaust gas output by the exhaust system of the vehicle into the intake system; and
an output circuit structured to provide the output signal to an actuator of at least one valve connected between the exhaust system and the intake system,
wherein the coasting detection circuit is further configured to generate the output signal to adjust a flow rate of the exhaust gas into the intake system such that a combined flow rate of the exhaust gas and atmospheric air into the intake system is substantially constant.

17. A method of operating an internal combustion engine of a vehicle, the method comprising:

detecting, by a controller, a coasting event while the vehicle is in motion;

activating, by the controller, an idle condition in response to the coasting event, the activating of the idle condition including drivingly decoupling the internal combustion engine from at least one wheel via a transmission and maintaining a nominal operating speed of the internal combustion engine;

detecting, by the controller, an increased engine load event; and deactivating, by the controller, the idle condition in response to the increased engine load event, the deactivating of the idle condition including drivingly coupling the internal combustion engine to the at least one wheel via the transmission.

18. The method of claim 17, further comprising:

increasing, by the controller, exhaust gas recirculation to the internal combustion engine in response to the coasting event; and decreasing, by the controller, exhaust gas recirculation to the internal combustion engine in response to the increased engine load event.

19. A method of operating an internal combustion engine of a vehicle, the method comprising:

detecting, by a controller, a coasting event while the vehicle is in motion; and activating, by the controller, an idle condition in response to the coasting event, the activating of the idle condition including drivingly decoupling the internal combustion engine from at least one wheel via a transmission and maintaining a nominal operating speed of the internal combustion engine, wherein the idle condition is activated after the coasting event has been detected for a set period of time.

20. The method of claim 18, wherein the exhaust gas recirculation to the internal combustion engine is increased after the coasting event has been detected for a set period of time.

21. A method of operating an internal combustion engine of a vehicle, the method comprising:

detecting, by a controller, a coasting event while the vehicle is in motion; and activating, by the controller, an idle condition in response to the coasting event, the activating of the idle condition including drivingly decoupling the internal combustion engine from at least one wheel via a transmission and maintaining a nominal operating speed of the internal combustion engine, wherein the coasting event is detected from an accelerator pedal position.

22. The method of claim 17, wherein the increased engine load event is detected from a threshold vehicle velocity.

23. The method of claim 17, wherein the increased engine load event is detected from a threshold negative vehicle acceleration.

* * * * *